(12) United States Patent
Cooper (10) Patent No.: US 7,020,105 B2
(45) Date of Patent: Mar. 28, 2006

(54) DYNAMIC RESOURCE ALLOCATION IN PACKET DATA TRANSFER

(75) Inventor: David Edward Cooper, Newbury (GB)

(73) Assignee: Matsushita Electric Industrial Co., LTD, Osaka (JP)

( * ) Notice: Subject to any disclaimer, the term of this patent is extended or adjusted under 35 U.S.C. 154(b) by 81 days.

(21) Appl. No.: 10/787,258

(22) Filed: Feb. 27, 2004

(65) Prior Publication Data

US 2004/0223483 A1    Nov. 11, 2004

(30) Foreign Application Priority Data

Apr. 2, 2003    (GB) .................................... 0307585

(51) Int. Cl.
*H04B 7/212*    (2006.01)

(52) U.S. Cl. ..................... 370/321; 370/324; 370/329; 370/333; 370/347; 370/442; 370/443; 370/444; 370/458; 370/459

(58) Field of Classification Search ................ 370/321, 370/324, 329, 347, 458, 459, 333, 442, 443, 370/444
See application file for complete search history.

(56) References Cited

U.S. PATENT DOCUMENTS

| | | | |
|---|---|---|---|
| 5,493,563 | A | 2/1996 | Rozanski et al. |
| 5,966,657 | A | 10/1999 | Sporre |
| 6,052,385 | A * | 4/2000 | Kanerva et al. ............ 370/468 |
| 6,321,083 | B1 | 11/2001 | Vaara et al. |
| 6,487,415 | B1 * | 11/2002 | Eibling et al. .............. 455/453 |
| 2001/0030956 | A1 | 10/2001 | Chillariga et al. |
| 2004/0151143 | A1 * | 8/2004 | Abdesselem et al. ....... 370/336 |

FOREIGN PATENT DOCUMENTS

| | | |
|---|---|---|
| EP | 0853439 | 7/1998 |
| EP | 853439 A2 * | 7/1998 |
| EP | 1109334 | 6/2001 |
| EP | 1248479 | 10/2002 |
| WO | 0074426 | 12/2000 |

OTHER PUBLICATIONS

Search Report dated Jul. 30, 2003.
TS 101 350 V8.5.0 (Jul. 2000), Digital cellular telecommunications system (Phase 2+); General Packet Radio Service (GPRS); Overall description of the GPRS radio interface; Stage 2 (GSM 03.64 version 8.5.0 Release 1999), pp. 1-58.
3GPP TS 05.08 V8.15.0 (Jun. 2000); 3GPP; Technical Specification Group GSM/EDGE Radio Access Network; Radio Subsystem link control (Release 1999) pp. 1-96.
European Search Report dated Aug. 13, 2004.
European Search Report dated Feb. 11, 2005.
European Search Report dated Feb. 24, 2005.
International Search Report dated Feb. 24, 2005.
3rd Generation Partnership Project: "Technical Specification Group GSM/EDGE Radio Access Network; GPRS; MS-BSS Interface; RLC/MAC Protocol (Release 6)," 3GPP TS 44.060, V6.1.0 Technical Specification, XP002315902, Valbonne, France, pp. 1-29 and 38-76, Feb. 2003.

* cited by examiner

*Primary Examiner*—Wellington Chin
*Assistant Examiner*—Kevin Mew
(74) *Attorney, Agent, or Firm*—Stevens, Davis, Miller & Mosher, LLP (57) ABSTRACT

A method for control of packet data transmissions in a TDMA wireless network to provide for additional choices in the allocation of communication channels. Measurement and recovery periods are re-assigned to avoid conflicts in operating conditions. The re-assignments for the GPRS system may be reduced to a simple formula.

24 Claims, 9 Drawing Sheets

DYNAMIC RESOURCE ALLOCATION IN PACKET DATA TRANSFER

BACKGROUND OF THE INVENTION

1. Field of the Invention

This invention relates to multiple access communication systems and in particular it relates to dynamic resource allocation in time division multiple access systems.

2. Description of Related Art

In Multiple access wireless systems such as GSM, a number of mobile stations communicate with a network. The allocation of physical communication channels for use by the mobile stations is fixed. A description of the GSM system may be found in The GSM System for Mobile Communications by M. Mouly and M. B. Pautet, published 1992 with the ISBN reference 2-9507190-0-7.

With the advent of packet data communications over Time Division Multiple Access (TDMA) systems, more flexibility is required in the allocation of resources and in particular in the use of physical communication channels. For packet data transmissions in General Packet Radio Systems (GPRS) a number of Packet Data CHannels (PDCH) provide the physical communication links. The time division is by frames of 4.615 ms duration and each frame has eight consecutive 0.577 ms slots. A description of the GPRS system may be found in (GSM 03.64 V 8.5 release 1999). The slots may be used for uplink or downlink communication. Uplink communication is a transmission from the mobile station for reception by the network to which it is attached. Reception by the mobile station of a transmission from the network is described as downlink.

In order to utilise most effectively the available bandwidth, access to channels can be allocated in response to changes in channel conditions, traffic loading Quality of service and subscription class. Owing to the continually changing channel conditions and traffic loadings a method for dynamic allocation of the available channels is available.

The amounts of time that the mobile station receives downlink or transmits uplink may be varied and slots allocated accordingly. The sequences of slots allocated for reception and transmission, the so-called multislot pattern is usually described in the form RXTY. The allocated receive (R) slots being the number X and the allocated transmit slots (T) the number Y.

A number of multislot classes, one through to 29, is defined for GPRS operation and the maximum uplink (Tx) and downlink (Rx) slot allocations are specified for each class. The specification for multislot class 12 is shown in Table 1 below.

In a GPRS system, access to a shared channel is controlled by means of an Uplink Status Flag (USF) transmitted on the downlink to each communicating mobile station (MS). In GPRS two allocation methods are defined, which differ in the convention about which uplink slots are made available on receipt of a USF. The present invention relates to a particular allocation method, in which an equal number "N" of PDCH's, where a "PDCH" uses a pair of uplink and downlink slots corresponding to each other on a 1-1 basis, are allocated for potential use by the MS. The uplink slots available for actual use by a particular mobile station sharing the uplink channel are indicated in the USF. The USF is a data item capable of taking 8 values V0–V7, and allows uplink resources to be allocated amongst up to 8 mobiles where each mobile recognises one of these 8 values as 'valid', i.e. conferring exclusive use of resources to that mobile. In the case of the extended dynamic allocation method, for example, reception of a valid USF in the slot 2 of the present frame will indicate the actual availability for transmission of transmit slots 2 . . . N in the next TDMA frame or group of frames, where N is the number of allocated PDCHs. Generally for a valid USF received at receiver slot n, transmission takes place in the next transmit frame at transmit slots n, n+1 et seq. to the allocated number of slots (N). For the extended dynamic allocation method as presently defined these allocated slots are always consecutive.

The mobile station is not able instantly to switch from a receive condition to a transmit condition or vice versa and the time allocated to these reconfigurations is known as turnaround time. As presently defined the turnaround time depends upon the class of mobile. A turnaround time of one slot is allocated in the case of class 12 mobiles such as are used for the exemplary embodiment. It is also necessary for the mobile station, whilst in packet transfer mode, to perform neighbourhood cell measurements. The mobile station has continuously to monitor all Broadcast Control Channel (BCCH) carriers as indicated by the BA(GPRS) list and the BCCH carrier of the serving cell. A received signal level measurement sample is taken in every TDMA frame, on at least one of the BCCH carriers. (GSM 05.08 10.1.1.2)

These neighbour cell measurements are taken prior to re-configuration from reception to transmission or prior to re-configuration from transmission to reception. The number of slots allocated to each of these measurements and re-configurations for multislot class 12 is two.

Arising from the requirement to allocate particular slots for turnaround and measurement purposes, some restrictions occur and potential dynamic channel allocations are lost. These restrictions reduce the availability of slots for uplink transmissions; reduce the flow of data and reduce the flexibility of response to changing conditions.

An exhaustive technical review and wholesale change to the existing prescribed operating conditions might be expected to alleviate the problems associated with dynamic allocation. Whilst this is possible, the considerable difficulties caused by such wholesale change would be generally unwelcome and this resolution of the technical problem is unlikely.

There is a need therefore to provide a solution to the problems affecting dynamic channel allocation with minimal effect on existing prior art methods.

SUMMARY OF THE INVENTION

It is an object of this invention to reduce the restrictions affecting dynamic channel allocation with minimal effect on the existing prescript.

In accordance with the invention there is provided a method for controlling packet data transmissions as set out in the attached claims.

BRIEF DESCRIPTION OF THE DRAWINGS

An embodiment of the invention will now be described with reference to the accompanying figures in which:

FIGS. 3 to 6 show 2 PDCH extended dynamic allocations in steady state for R2T0, R2T1 and R2T2 respectively with associated measurement and turnaround intervals;

DETAILED DESCRIPTION OF THE PREFERRED EMBODIMENTS

In this embodiment, the invention is applied to a GPRS wireless network operating in accordance with the standards applicable to multislot class 12.

Figure 1:
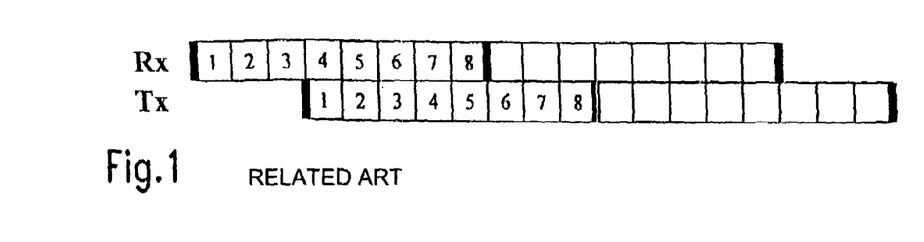
FIG. 1 illustrates the GPRS TDMA frame structure showing the numbering convention used for uplink and downlink timeslots.

In FIG. 1 the GPRS TDMA frame structure is illustrated and shows the numbering convention used for uplink and downlink timeslots. It should be noted that in practice Tx may be advanced relative to Rx due to timing advance, although this is not shown in the illustration. Thus in practice the amount of time between the first Rx and first Tx of a frame may be reduced a fraction of a slot from the illustrated value of 3 slots due to timing advance. Two successive TDMA frames are illustrated with receiver (Rx) and transmitter (Tx) slots identified separately. The slot positions within the first frame are shown by the numerals 1 through to 8 with the transmission and reception slots offset by a margin of three slots. This is in accordance with the convention that that the first transmit frame in a TDMA lags the first receive frame by an offset of 3 (thus ordinary single slot GSM can be regarded as a particular case in which only slot 1 of transmit and receive is used).

The remaining figures (save for the state transition diagrams) conform to the illustration of FIG. 1 but the slot numbering has been removed for extra clarity. The shaded slots are those allocated for the particular states and the arrowed inserts e.g. numerals 41 and 42 of FIG. 4 indicate the applicable measurement and turnaround intervals and number of slots allocated for these intervals. The hashed slots e.g. numeral 43 of FIG. 4 indicate reception of a valid USF. As mentioned above, constraints are imposed by the need to allow measurement and turnaround slots and the prescript for these in 05.02 Annex B limits dynamic allocation as shown in table 1 for the example of multislot class 12.

TABLE 1

| Multislot class | Maximum number of slots | | | Minimum number of slots | | | |
|---|---|---|---|---|---|---|---|
| | Rx | Tx | Sum | $T_{ta}$ | $T_{tb}$ | $T_{ra}$ | $T_{rb}$ |
| 12 | 4 | 4 | 5 | 2 | 1 | 2 | 1 |

$T_{ta}$ is the time needed for the MS to perform adjacent cell signal level measurement and get ready to transmit.
$T_{tb}$ is the time needed for the MS to get ready to transmit
$T_{ra}$ is the time needed for the MS to perform adjacent cell signal level measurement and get ready to receive.
$T_{rb}$ is the time needed for the MS to get ready to receive
It should be noted that in practice the times $T_{ta}$ and $T_{tb}$ may be reduced by a fraction of a slot due to timing advance.

The measurement period for extended dynamic allocation is specified (05.02 6.4.2.2) as Tra. That is to say that all neighbour measurements are taken just before the first receive slot and not before the transmit slot.

If there are m timeslots allocated for reception and n timeslots allocated for transmission, then there must be Min(m,n) reception and transmission timeslots with the same timeslot number.

Figure 2:
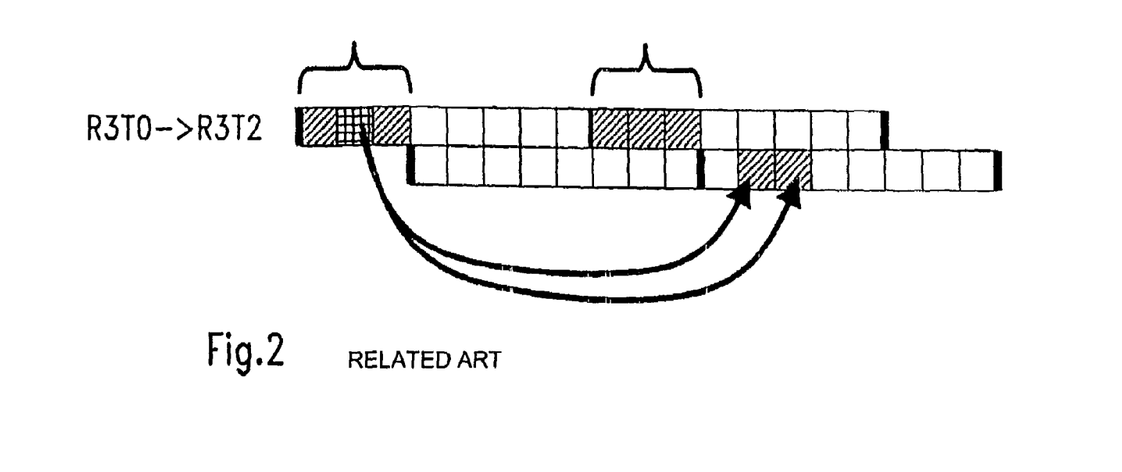
FIG. 2 illustrates a 3 slot allocation and a state transition from R3T0 to R3T2.

With reference to FIG. 2, an example of a 3 slot allocation, annotated R3T0→R3T2, is shown with no uplink slot allocated initially. A valid USF received on Rx slot 2 allows 2 TX slots on the next uplink frame. The annotation → indicates a change of state.

Figure 3:
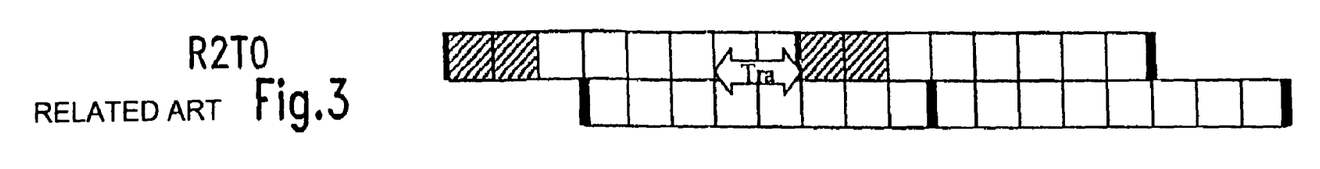
Figure 4:
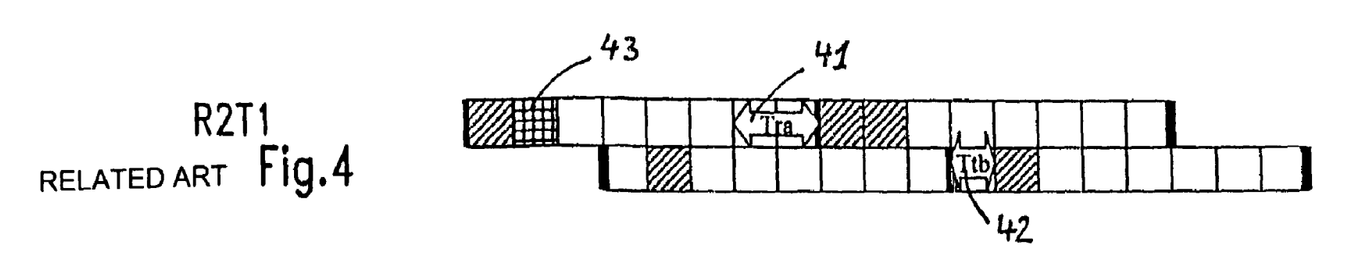
Figure 5:
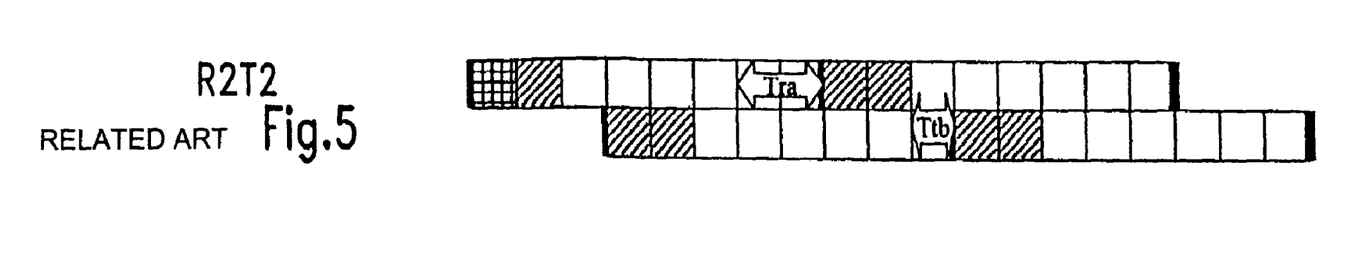
Figure 6:
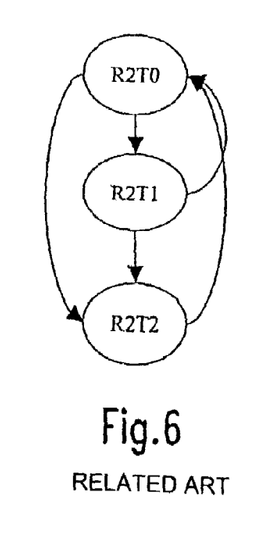
FIG. 6 is a state transition diagram for 2 PDCH extended dynamic allocations.

The FIGS. 3 to 5 show steady state extended dynamic allocations for 2 PDCH according to the annotations and the measurement and turnaround intervals are marked. FIG. 6 is a state transition diagram for 2 PDCH extended dynamic allocations and shows all of the allowed states.

Figure 7:
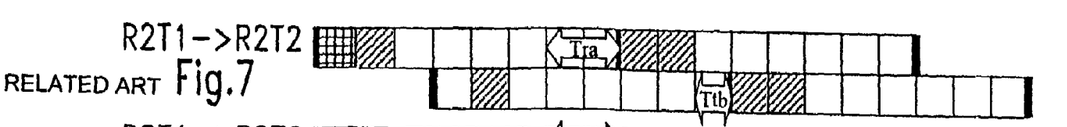
FIGS. 7 to 11 show the state transitions of FIG. 6.
Figure 8:
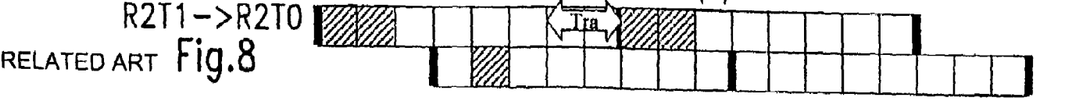
Figure 9:
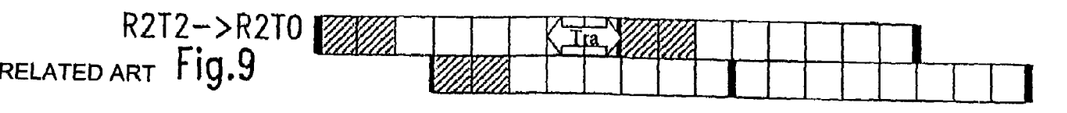
Figure 10:
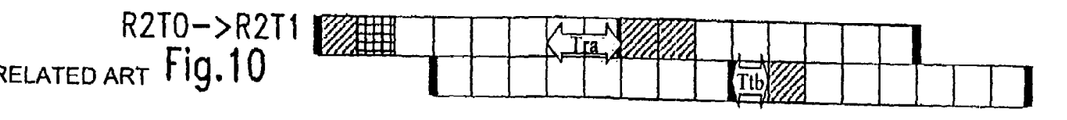
Figure 11:
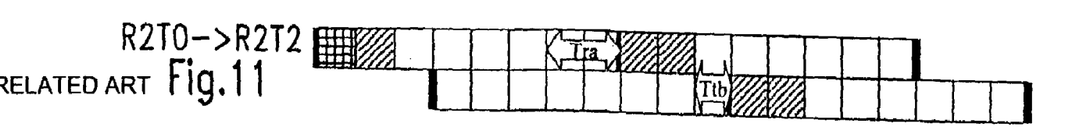
Figure 12:
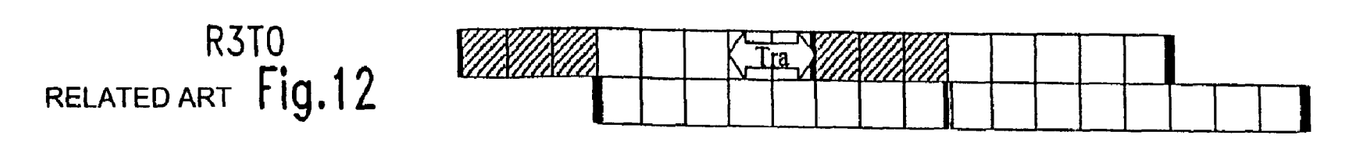
FIG. 12 to 15 show the 3 PDCH extended dynamic allocation in steady state.
Figure 13:
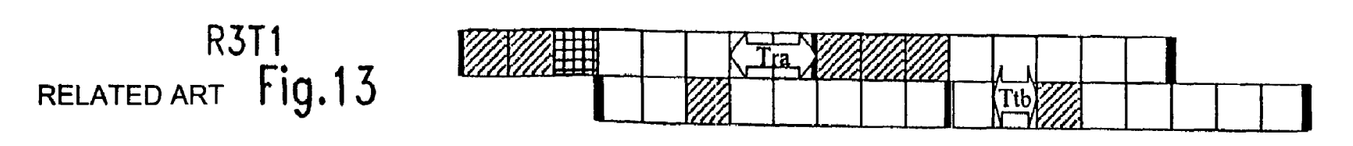
Figure 14:
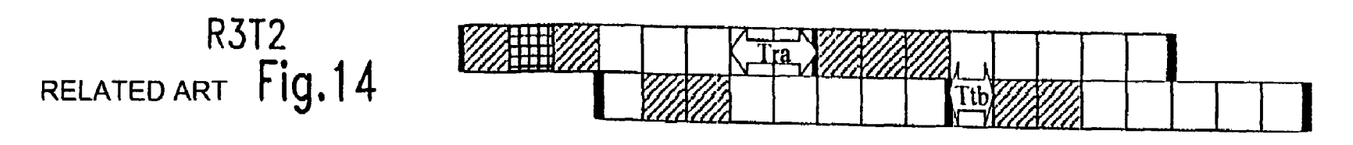
Figure 15:
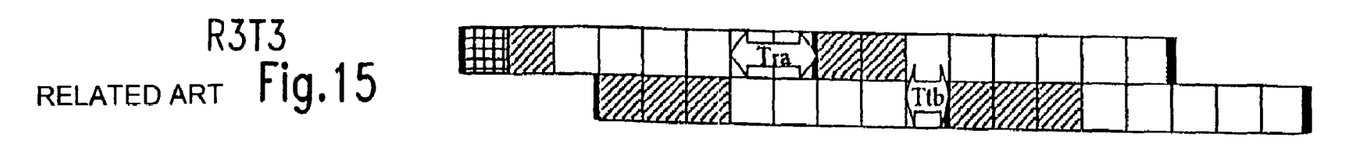

FIGS. 7 through to 11 show the slot positions and applicable measurement and turnaround intervals for the transitions of FIG. 6.

Figure 16:
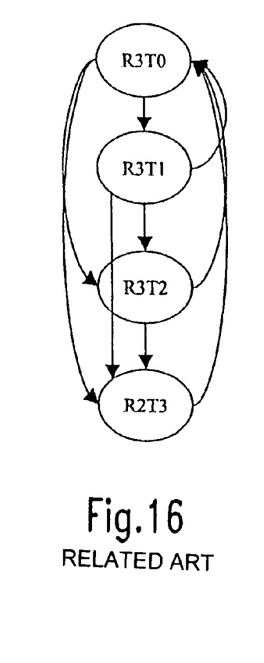
FIG. 16 is a state transition diagram for 3 PDCH extended dynamic allocation.
Figure 17:
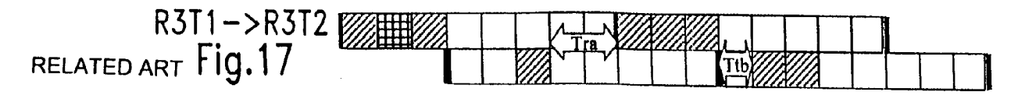
FIGS. 17 to 25 show the state transitions of FIG. 16.
Figure 18:
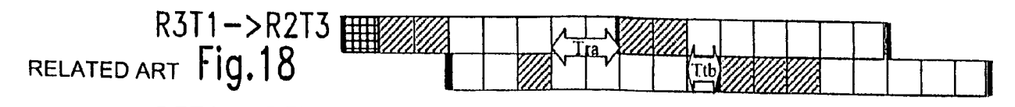
Figure 19:
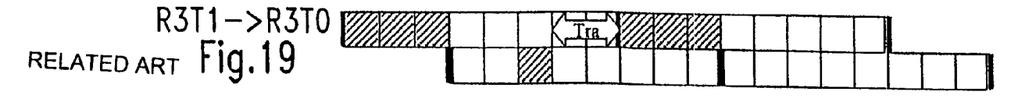
Figure 20:
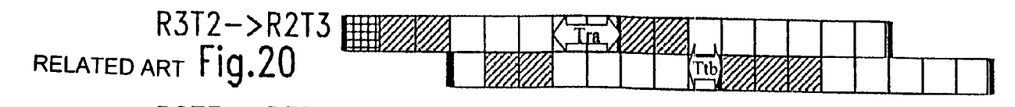
Figures 21, 22:
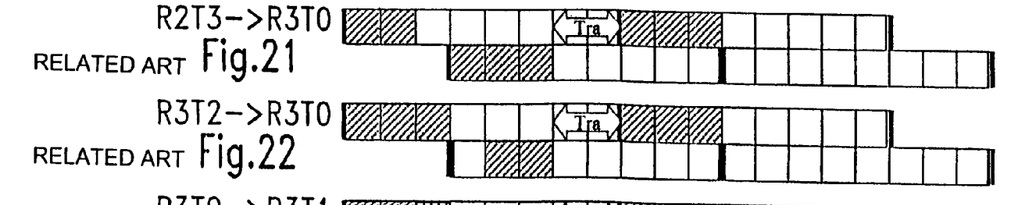
Figures 23, 24, 25:
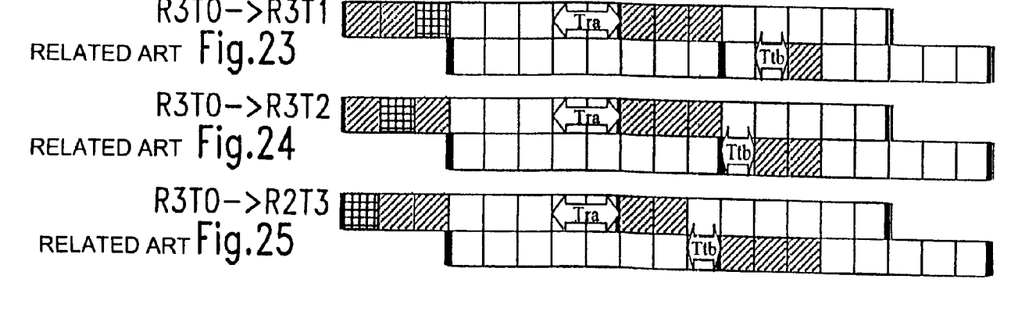

Steady state 3 PDCH extended dynamic allocations are shown in FIGS. 12 to 15. The state transitions for 3PDCH are shown in FIG. 16 and the corresponding slot positions and measurement and turnaround intervals in FIGS. 17 to 25. It can be seen that for all of the illustrations no impediment to slot allocation arises from the application of the measurement and turnaround intervals.

Figures 26, 27:
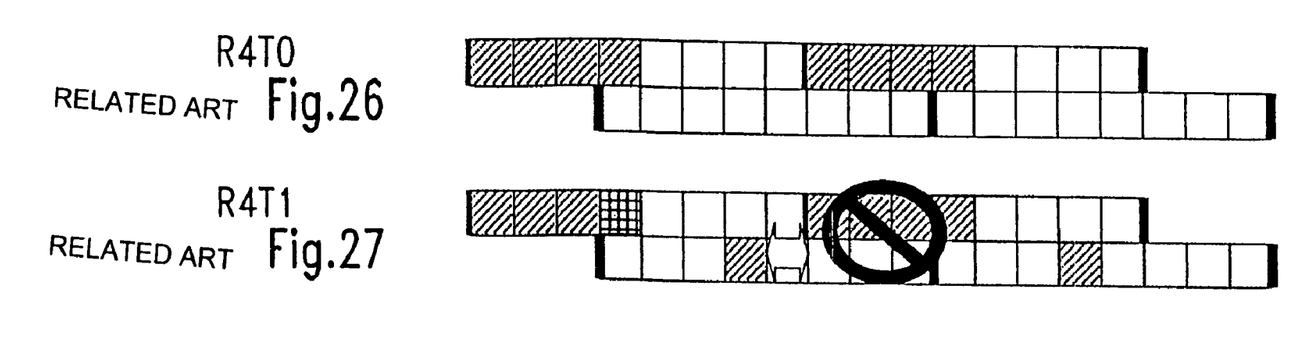
FIGS. 26 to 30 show the steady state 4 slot extended dynamic allocation of the prior art.
Figures 28, 29:
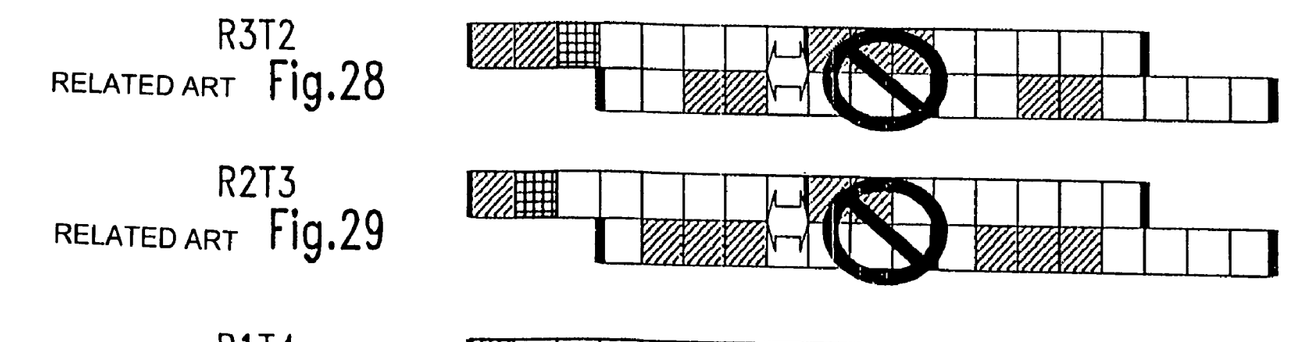
Figure 30:
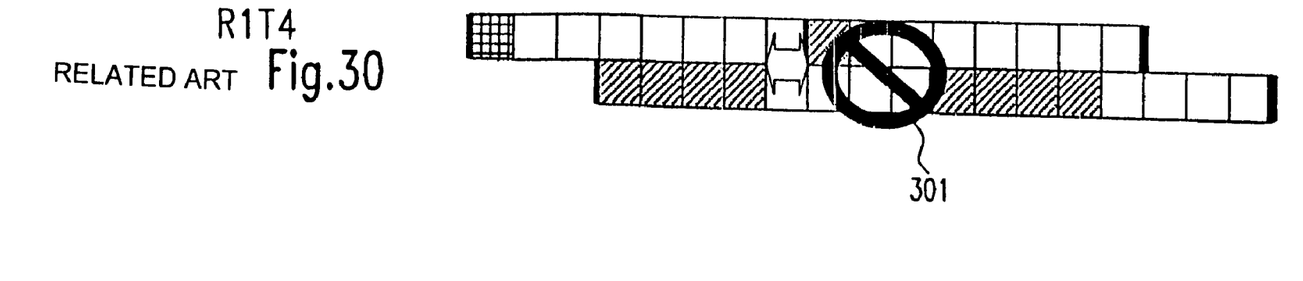
Figure 31:
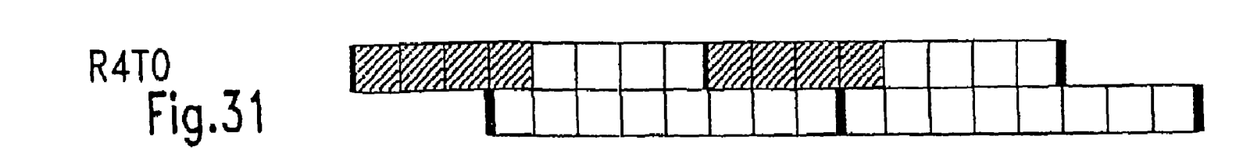
FIGS. 31 to 35 show the steady state 4 slot extended dynamic allocation in accordance with the invention.

With 4 slot extended dynamic allocations, however conflicts occur and the prescribed conditions do not permit implementation beyond the steady state R4T0 case illustrated in FIG. 26. This is because the constraint $T_{ra}=2$ for neighbour cell measurement cannot be applied since Tx slot 4 is always used, leaving only a single slot turnaround time before Rx slot 1. Examples of allowed and prohibited 4 slot extended dynamic allocations in accordance with the prior art are shown in FIGS. 26 to 30. These indicate steady states and the four receive slots and no transmit slot R4T0 state of FIG. 26 is allowed. The allocations prohibited are overlaid by a "no entry" logo (e.g. numeral 301 of FIG. 30) in the illustrations of FIG. 27, R4T1, FIG. 28, R3T2, FIG. 29 R2T3 and FIG. 30 R1T4. It can be seen that these prohibitions arise because of the limitation of one slot allowed for the measurement and preparation Tra (the time needed to measure and then prepare for transmission).

In accordance with the invention there is re-allocation of measurement and recovery periods to increase the availability of uplink resources when uplink resources are otherwise constrained by prescribed allocations.

Application of the method in accordance with the invention provides for the previously prohibited allocations of FIGS. 27 to 30 to be admitted as shown in FIGS. 32 to 35. If N slots are allocated, and N+$T_{ra}$+3 <=8 (number of slots in a frame), then $T_{ra}$ is used as the measurement interval otherwise if N+$T_{ra}$+3 >8 . . . (XX), then $T_{ta}$ is used as the measurement interval;

where

<=less than or equal to

Figure 32:
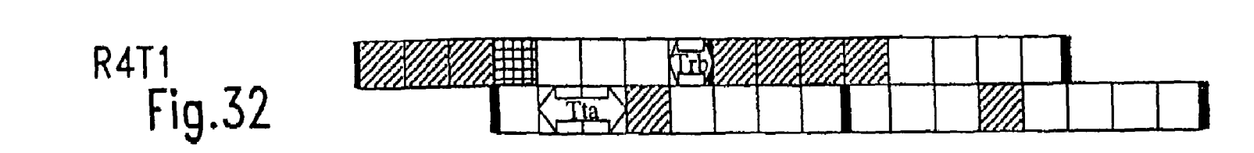

> greater than $T_{ta}$ is the time needed to measure and then prepare for transmission Application of the method to the steady state R4T1 is shown in FIG. 32, With the number of PDCH's allocated N=4, the measurement and preparation interval $T_{ra}=2$, N+$T_{ra}$+3>8 (4+2+3=9) therefore $T_{ta}$ is used as the measurement interval. The impediment to operation shown in FIG. 27 is therefore removed by application of the method as illustrated in FIG. 32.

This procedure is implemented in the mobile station which when using the extended dynamic allocation method, and on receiving an allocation of PDCH numbering 'N', must perform the comparison above in order to time the radio link measurement procedure correctly.

The procedure performed by the network equipment is that when allocating a number of PDCHs 'N', it recognise that when N satisfies the condition (XX) above it must take into account the capability of the mobile station to perform measurements using $T_{ta}$ and provided that: $N+T_{rb}+3<=8$, is capable of allocating such a number of PDCHs.

Figure 33:
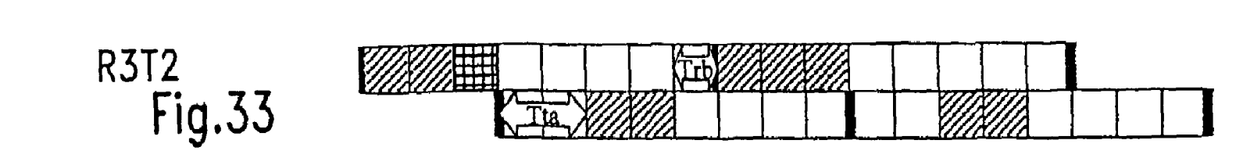
Figure 34:
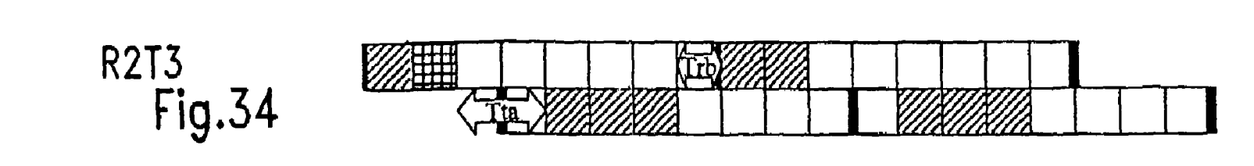
Figure 35:
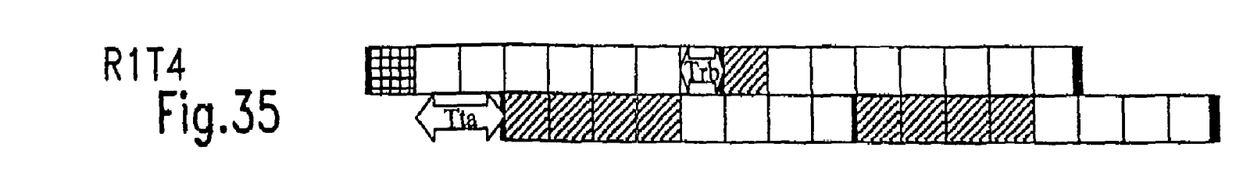
Figure 36:
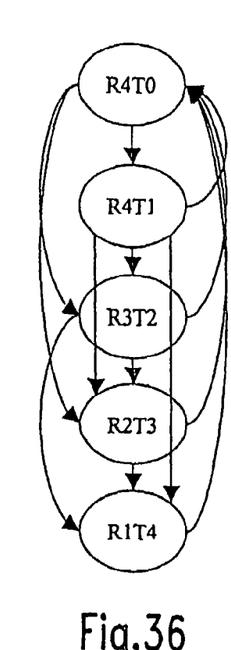
FIG. 36 is a state transition diagram for 4 slot extended dynamic allocation in accordance with the invention.
Figures 37, 38, 39:
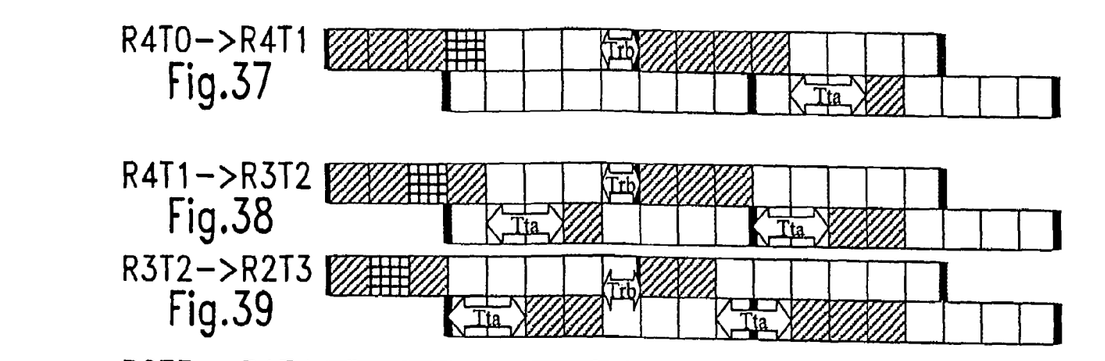
FIGS. 37 to 50 show the state transitions of FIG. 36.
Figure 40:
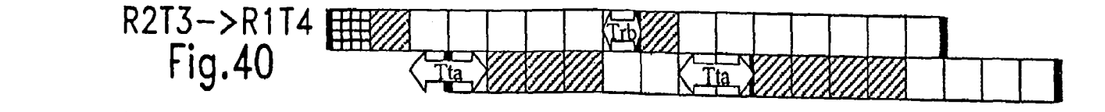
Figures 41, 42:
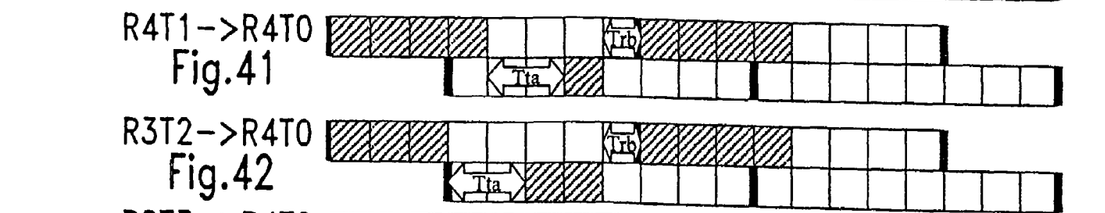
Figure 43:
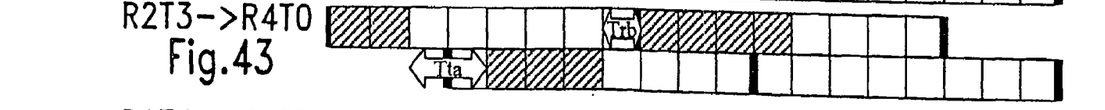
Figure 44:
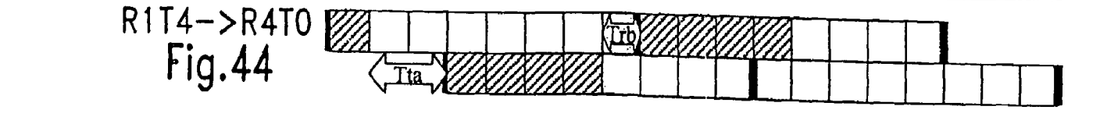
Figure 45:
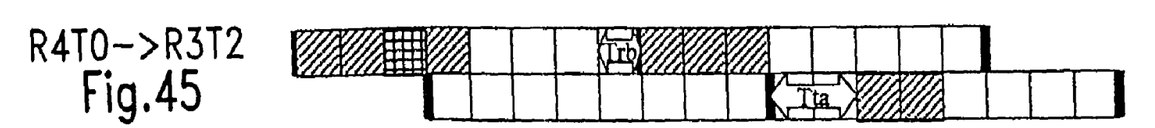
Figure 46:
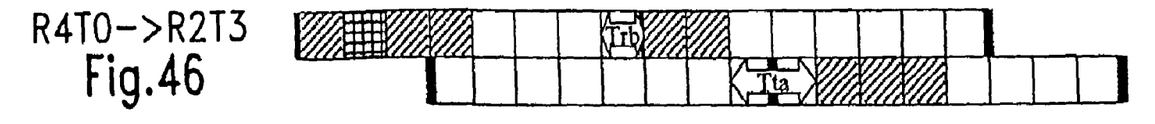
Figure 47:
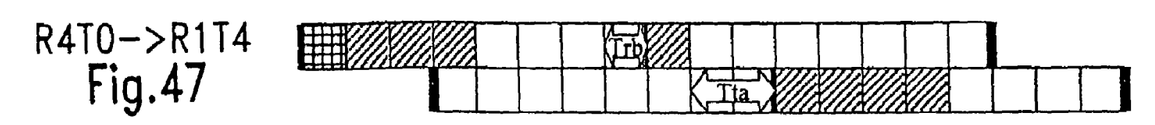
Figure 48:
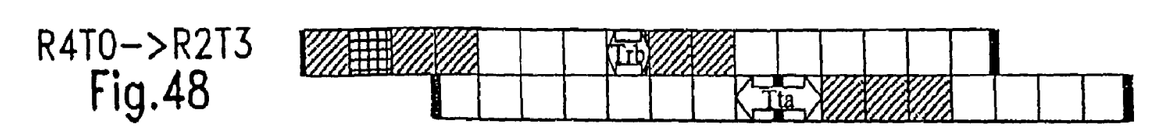
Figure 49:
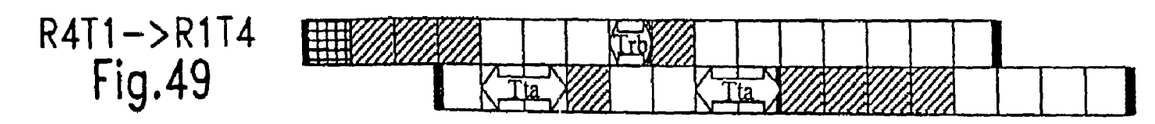
Figure 50:
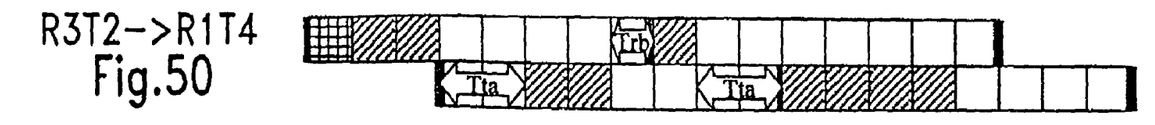

The method may be applied successfully to the remaining steady states shown in FIGS. 33, 34 and 35. Furthermore the method is effective for all of the 4 slot state transitions shown in the state transition diagram FIG. 6. Illustrations of the 4 slot state transitions are given in FIGS. 37 through to 50.

What is claimed is:

1. A communication method used in a mobile station apparatus which performs communication using a TDMA frame formed by eight slots, a start of a TDMA frame on an uplink being delayed by three slots or three slots minus a fraction of a slot from a start of a TDMA frame on a downlink, the method comprising:

receiving using a reception slot of the TDMA frame on the downlink after getting ready to receive;

transmitting using a transmission slot of the TDMA frame on the uplink after getting ready to transmit; and performing adjacent cell signal level measurement before either getting ready to receive or getting ready to transmit, wherein (I) when a number of transmission slots used in one TDMA frame on the uplink is below a predetermined number, then, after transmitting using a transmission slot of the TDMA frame on the uplink, a time allocation of two consecutive slots shall apply for performing adjacent cell signal level measurement and getting ready to receive and (ii) when the number of transmission slots used in one TDMA frame on the uplink is the predetermined number, then, after receiving using a reception slot of the TDMA frame on the downlink, a time allocation of two consecutive slots shall apply for performing adjacent cell signal level measurement and getting ready to transmit.

2. A communication method used in a mobile station apparatus which performs communication using a TDMA frame formed by eight slots, a start of a TDMA frame on an uplink being delayed by three slots or three slots minus a fraction of a slot from a start of TDMA frame on a downlink, the method comprising:

receiving using a reception slot of the TDMA frame on the downlink after getting ready to receive;

transmitting using a transmission slot of the TDMA frame on the uplink after getting ready to transmit; and performing adjacent cell signal level measurement before either getting ready to receive or getting ready to transmit, wherein when a number of transmission slots used in one TDMA frame on the uplink is a predetermined number and when there is not a time of two slots necessary for the adjacent cell signal level measurement and getting ready to receive after a last used transmission slot, then a time allocation of two consecutive slots is provided for performing adjacent cell signal level measurement and getting ready to transmit before a first transmission slot.

3. A communication method used in a mobile station apparatus which performs communication using a TDMA frame formed by eight slots, a start of a TDMA frame on an uplink being delayed by three slots or three slots minus a fraction of a slot from a start of a TDMA frame on a downlink, the method comprising:

receiving using a reception slot of the TDMA frame on the downlink after getting ready to receive;

transmitting using a transmission slot of the TDMA frame on the uplink after getting ready to transmit; and performing adjacent cell signal level measurement before either getting ready to receive or getting ready to transmit, wherein (I) when a number of transmission slots used in one TDMA frame on the uplink is below a predetermined number, then $T_{ra}$ and $T_{tb}$ shall apply, $T_{ra}$ being a time needed for the mobile station apparatus to perform adjacent cell signal level measurement and get ready to receive and a minimum number of slots of $T_{ra}$ being two slots, and $T_{tb}$ being a time needed for the mobile station apparatus to get ready to transmit and a minimum number of slots of $T_{tb}$ being one slot, and (ii) when the number of transmission slots used in one TDMA frame on the uplink is the predetermined number, then $T_{ta}$ and $T_{rb}$ shall apply, $T_{ta}$ being a time needed for the mobile station apparatus to perform adjacent cell signal level measurement and get ready to transmit_and a minimum number of slots of $T_{ta}$ being two slots, and $T_{rb}$ being a time needed for the mobile station apparatus to get ready to receive and a minimum number of slots of $T_{rb}$ being one slot.

4. The method according to claim 1, wherein the predetermined number is four.

5. The method according to claim 2, wherein the predetermined number is four.

6. The method according to claim 3, wherein the predetermined number is four.

7. The method according to claim 1, wherein the method is applied to a mobile station of a multislot class 12 in a General Packet Radio System (GPRS).

8. The method according to claim 2, wherein the method is applied to a mobile station of a multislot class 12 in a General Packet Radio System (GPRS).

9. The method according to claim 3, wherein the method is applied to a mobile station of a multislot class 12 in a General Packet Radio System (GPRS).

10. A mobile station apparatus which performs communication using a TDMA frame formed by eight slots, start of a TDMA frame on an uplink being delayed by three slots or three slots minus a fraction of a slob from a start of a TDMA frame on a downlink, the apparatus comprising:

a reception section that receives using a reception slot of the TDMA frame on the downlink after getting ready to receive;

a transmission section that transmits using a transmission slot of the TDMA frame on the uplink after getting ready to transmit; and a measurement section that performs adjacent cell signal level measurement before either getting ready to receive or getting ready to transmit, wherein (I) when a number of transmission slots used in one TDMA frame on the uplink is below a predetermined number, then, after transmitting using a transmission slot of the TDMA frame on the uplink, a time allocation of two consecutive slots shall apply for performing adjacent cell signal level measurement and getting ready to receive and (ii) when the number of transmission slots used in one TDMA frame on the uplink is the predetermined number, then, after receiving using a reception slot of the TDMA frame on the downlink, a time allocation of two consecutive slots shall apply for performing adjacent cell signal level measurement and getting ready to transmit.

11. A mobile station apparatus which performs communication using a TDMA frame formed by eight slots, a start of a TDMA frame on an uplink being delayed by three slots or three slots minus a fraction of a slot from a start of a TDMA frame on a downlink, the apparatus comprising:
   a reception section that receives using a reception slot of the TDMA frame on the downlink after getting ready to receive;
   a transmission section that transmits using a transmission slot of the TDMA frame on the uplink after getting ready to transmit; and
   a measurement section that performs adjacent cell signal level measurement before either getting ready to receive or getting ready to transmit,
   wherein when a number of transmission slots used in one TDMA frame on the uplink is a predetermined number and when there is not a time of two slots necessary for performing adjacent cell signal level measurement and getting ready to receive after a last used transmission slot, then a time allocation of two consecutive slots is provided for performing adjacent cell signal level measurement and getting ready to transmit before a first transmission slot.

12. A mobile station apparatus which performs communication using a TDMA frame formed by eight slots, a start of a TDMA frame on an uplink being delayed by three slots or three slots minus a fraction of a slot from a start of a TDMA frame on a downlink, the apparatus comprising:
   a reception section that receives using a reception slot of the TDMA frame on the downlink after getting ready to receive;
   a transmission section that transmits using a transmission slot of the TDMA frame on the uplink after getting ready to transmit; and
   a measurement section that performs adjacent cell signal level measurement before either getting ready to receive or getting ready to transmit,
   wherein (I) when a number of transmission slots used in one TDMA frame on the uplink is below a predetermined number, then $T_{ra}$ and $T_{tb}$ shall apply, $T_{ra}$ being a time needed for the mobile station apparatus to perform adjacent cell signal level measurement and get ready to receive and a minimum number of slots of $T_{ra}$ being two slots, and $T_{tb}$ being a time needed for the mobile station apparatus to get ready to transmit and a minimum number of slots of $T_{tb}$ being one slot, and (ii) when the number of transmission slots used in one TDMA frame on the uplink is the predetermined number, then $T_{ta}$ and $T_{rb}$ shall apply, $T_{ta}$ being a time needed for the mobile station apparatus to perform, adjacent cell signal level measurement and get ready to transmit and a minimum number of slots of $T_{ta}$ being two slots, and $T_{rb}$ being a time needed for the mobile station apparatus to get ready to receive and a minimum number of slots of $T_{rb}$ being one slot.

13. The apparatus according to claim 10, wherein the predetermined number is four.

14. The apparatus according to claim 11, wherein the predetermined number is four.

15. The apparatus according to claim 12, wherein the predetermined number is four.

16. The apparatus according to claim 10, wherein the apparatus is a mobile station of multislot class 12 in a General Packet Radio System (GPRS).

17. The apparatus according to claim 11, wherein the apparatus is a mobile station of a multislot class 12 in a General Packet Radio System (GPRS).

18. The apparatus according to claim 12, wherein the apparatus is a mobile station of a multisiot class 12 in a General Packet Radio System (GPRS).

19. A communication method used in a mobile station apparatus which performs communication using a TDMA frame formed by eight slots, a start of a TDMA frame on an uplink being delayed by three slots or three slots minus a fraction of a slot from a start of a TDMA frame on a downlink, the method comprising:
   receiving using a reception slot of the TDMA frame on the downlink after getting ready to receive;
   transmitting using a transmission slot of the TDMA frame on the uplink after getting ready to transmit; and
   performing adjacent cell signal level measurement before either getting ready to receive or getting ready to transmit,
   wherein when a number of transmission slots used in one TDMA frame on the uplink is a predetermined number and when there is a time of less than two slots after a last used transmission slot, then a time allocation of two consecutive slots is provided for performing adjacent cell signal level measurement and getting ready to transmit before a first transmission slot.

20. A mobile station apparatus which performs communication using a TDMA frame formed by eight slots, a start of a TDMA frame on an uplink being delayed by three slots or three slots minus a fraction of a slot from a start of a TDMA frame on a downlink, the apparatus comprising:
   a reception section that receives using a reception slot of the TDMA frame on the downlink after getting ready to receive;
   a transmission section that transmits using a transmission slot of the TDMA frame on the uplink after getting ready to transmit; and
   a measurement section that performs adjacent cell signal level measurement before either getting ready to receive or getting ready to transmit,
   wherein when a number of transmission slots used in one TDMA frame on the uplink is a predetermined number and when there is a time of less than two slots after a last used transmission slot, then a time allocation of two consecutive slots is provided for performing adjacent cell signal level measurement and getting ready to transmit before a first transmission slot.

21. The method according to claim 19, wherein the predetermined number is four.

22. The method according to claim 19, wherein the method is applied to a mobile station of a multislot class 12 in a General Packet Radio system (GPRS).

23. The apparatus according to claim 20, wherein the predetermined number is four.

24. The apparatus according to claim 20, wherein the method is applied to a mobile station of a multislot class 12 in a General Packet Radio system (GPRS).

* * * * *